United States Patent
Nyu

(10) Patent No.: US 7,145,915 B1
(45) Date of Patent: *Dec. 5, 2006

(54) CIRCUIT AND METHOD FOR EXCHANGING SIGNALS BETWEEN NETWORK NODES

(75) Inventor: Takayuki Nyu, Tokyo (JP)

(73) Assignee: NEC Corporation, Tokyo (JP)

( * ) Notice: Subject to any disclaimer, the term of this patent is extended or adjusted under 35 U.S.C. 154(b) by 769 days.

This patent is subject to a terminal disclaimer.

(21) Appl. No.: 09/598,477

(22) Filed: Jun. 22, 2000

(30) Foreign Application Priority Data

Jun. 23, 1999 (JP) ................................. 11-176168

(51) Int. Cl.
*H04L 12/42* (2006.01)
*G06F 13/00* (2006.01)

(52) U.S. Cl. ........................ 370/450; 710/100; 710/105

(58) Field of Classification Search ................ 370/278, 370/282, 449, 450, 451, 456, 421, 423; 710/100, 710/104, 105
See application file for complete search history.

(56) References Cited

U.S. PATENT DOCUMENTS

| | | | |
|---|---|---|---|
| 5,727,002 A | 3/1998 | Miller et al. ................. | 714/748 |
| 5,870,556 A * | 2/1999 | Cote et al. ................... | 709/224 |
| 6,038,234 A * | 3/2000 | LaFollette et al. .......... | 370/443 |
| 6,046,817 A * | 4/2000 | Brown et al. ............... | 358/1.16 |
| 6,119,195 A * | 9/2000 | Ellis et al. ................... | 710/310 |
| 6,393,489 B1 * | 5/2002 | Sambamurthy et al. ..... | 709/250 |
| 6,513,085 B1 * | 1/2003 | Gugel et al. ................. | 710/305 |
| 6,609,167 B1 * | 8/2003 | Bastiani et al. ............. | 710/104 |

FOREIGN PATENT DOCUMENTS

| | | |
|---|---|---|
| EP | 0 868 048 A1 | 9/1998 |
| EP | 0 872 980 A2 | 10/1998 |
| JP | 2000-13379 | 1/2000 |

\* cited by examiner

*Primary Examiner*—Doris H. To
*Assistant Examiner*—Saba Tsegaye
(74) *Attorney, Agent, or Firm*—McGinn IP Law Group, PLLC

(57) ABSTRACT

In a network node attached to a serial bus, a first count value is incremented beginning with the start timing of a child notify signal transmitted from the node to the bus until the end timing of a parent notify signal received by the node from said bus. The first count value represents the turnaround time of signals between the node and a node attached to the remote end of the serial bus. Normally, signals from the serial bus are supplied to a higher layer. Instead of the received bus signal, an idle signal is supplied to the higher layer for an interval beginning with the end timing of a packet transmitted from the higher layer to the bus until the interval corresponds to the turnaround time.

20 Claims, 13 Drawing Sheets

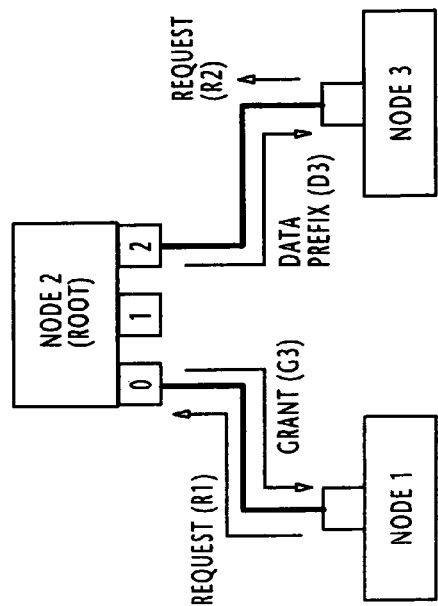
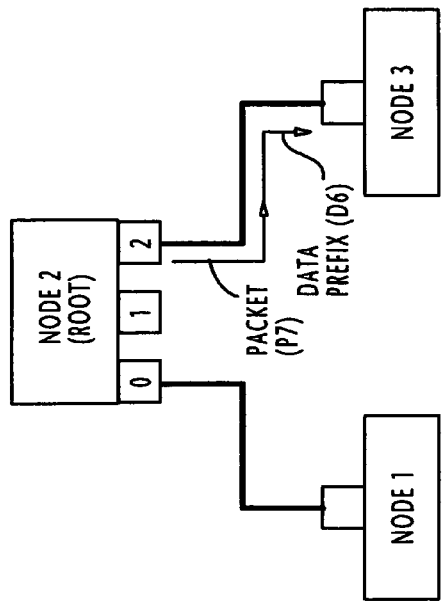
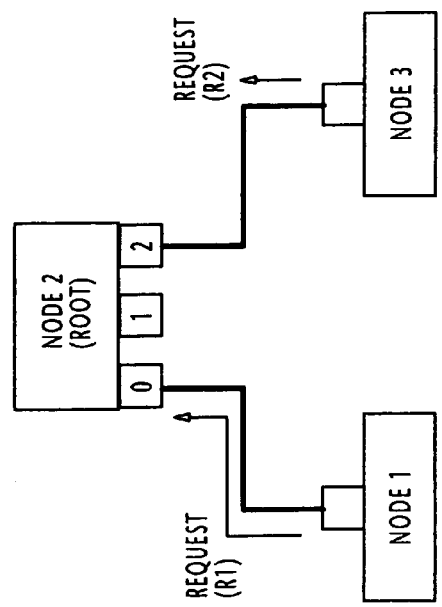
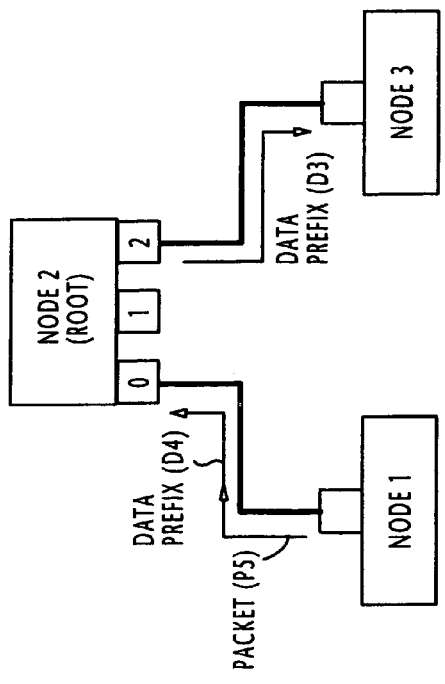

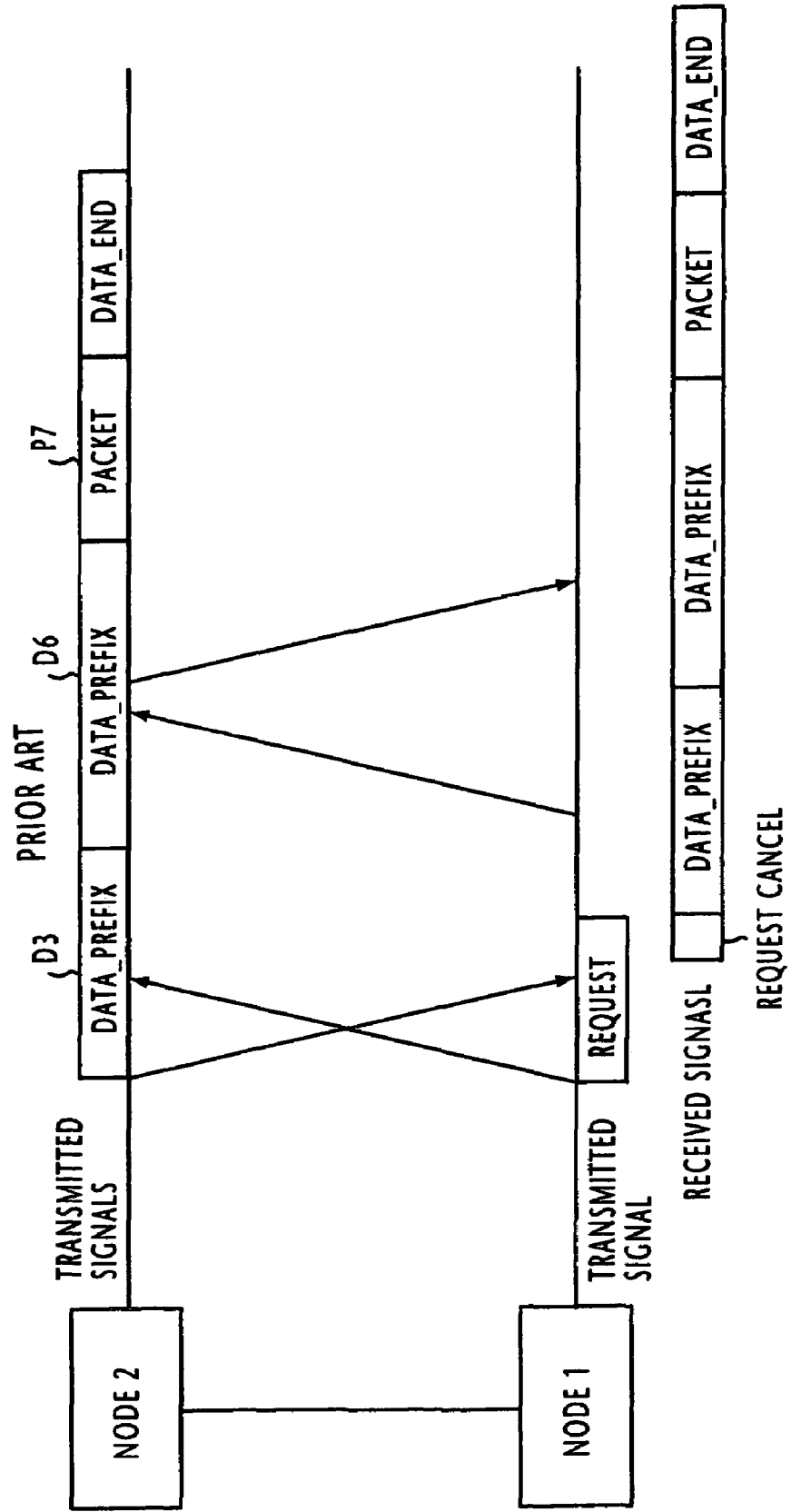

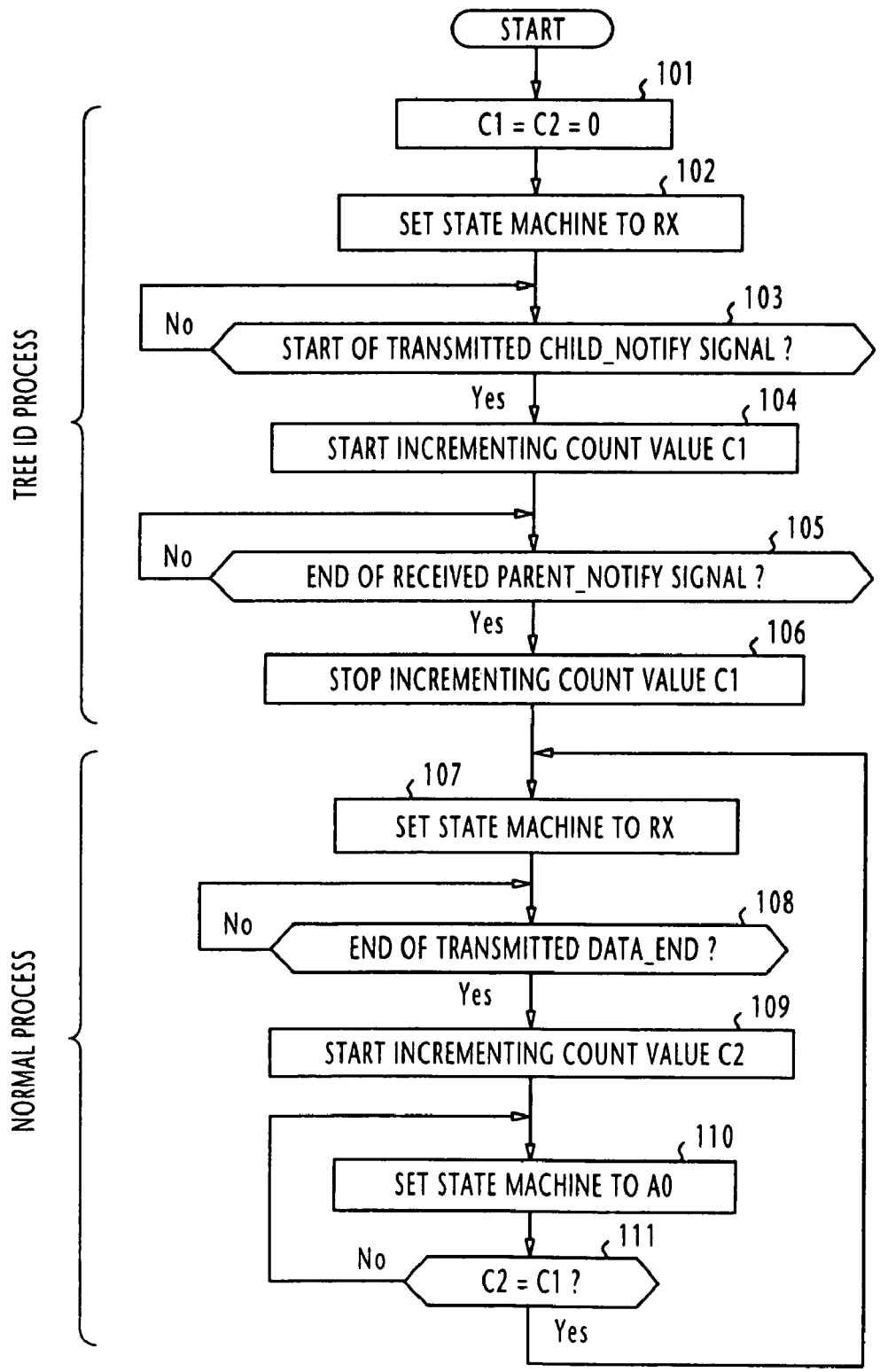

CIRCUIT AND METHOD FOR EXCHANGING SIGNALS BETWEEN NETWORK NODES

BACKGROUND OF THE INVENTION

1. Field of the Invention

The present invention relates to transmission and reception of signals between devices (nodes) attached to a computer over a serial bus such as the IEEE-1394 bus specified according to the IEEE-1394 Standard for a High Performance Serial Bus (or IEEE Std 1394-1995).

2. Description of the Related Art

The IEEE 1394 standard specifies protocols for the transmission and reception of various control signals and communication signals between peripheral devices of a computer such as printers, hard disk drives, scanners, digital cameras (nodes) at different layers of each node connected to a serial bus. For the physical layer of each node, a procedure is specified for bus initialisation and determination of bus ownership. This procedure is described by a state machine having four broadly classified functions. The bus initialisation procedure consists of three network initialisation processes (Bus Reset process, Tree ID process, and Self ID process) and a Normal process (for normal communication between nodes).

For each of these processes a number of states are defined. For Bus Reset process, states R0 (Reset Start) and R1 (Reset Wait) are defined, and for Tree ID process states T0 (Tree ID start), T1 (Child Handshake), T2 (Parent Handshake) and T3 (Root Contention) are defined. Similarly, five states are defined for Self ID process, including S0 (Self ID Start), S1 (Self ID Grant), S2 (Self ID Receive), S3 (Send Speed Capabilities) and S4 (Self ID Transmit), and six states are defined for Normal process, including A0 (Idle), A1 (Request), A2 (Grant), TX (Transmit), RX (Receive) and PH (PHY Response). The present invention is concerned with Tree ID and Normal processes. The sequences of line states that occur during a Tree ID process and a Normal process are respectively shown in FIGS. 1 and 2.

In FIG. 1, a Tree ID process between nodes A and B is shown. This process is a handshaking process which begins with the node B asserting a Parent Notify state on the serial bus. Node A, on detecting the Parent Notify state, asserts a child notify state on the serial bus. In response, the node B deasserts the parent notify state and returns the bus to Idle state. With this process, the node A is determined as a parent of node B and the node B as a child of node A.

FIG. 2 shows the essential states of a state machine of a node during Normal process which are concerned with the present invention. The node has each connected port labelled parent if it is pointing towards the root node that is authorised to assign the ownership of the serial bus and labelled child if it is pointing towards a node (i.e., child) located on one side of the node that is opposite to the root node. State A0 indicates the Idle state of the node in which it drives an idle signal to the serial bus. If a node, except for the root node, is in the Idle state and receives a Request signal from its child port, it changes to state A1. If the root node receives a Request signal from its child port, it changes from Idle state to state A2 (=Grant). If a node, regardless of its type, receives a Data Prefix (i.e., indicating the start of transmission of data) during state A0, it changes to state RX in which it receives packets.

If the node is in state A1 and receives a Grant signal from its parent port, it changes to state A0 (=Idle) if a Request signal from its child port is cancelled or changes to state A2 (=Grant) if such a Request signal persists. If the node receives a Data Prefix from the parent port, it recognises that a Request signal from its child port is cancelled and changes to state RX in order to receive packets from the parent port. If a node is in state A1 (=Request) to transmit packets and receives a Grant signal from the parent port, it changes to state TX in order to transmit packets.

When the node is in state A2 (=Grant), it changes to state A0 if it receives a Request cancel signal from its child port, or changes to state RX if it receives a Data Prefix signal. If the node is in state RX, it changes to state A0 if it receives an Idle signal from the port from which packets are being received. If the node is in state TX, it returns to state A0 at the end of transmission of packets.

FIG. 3 shows various line states of nodes A and B interconnected by shielded twisted pairs TPA and TPB (with a maximum length of 4.5 meters) when they exchange arbitration signals to gain bus ownership using data-strobe encoding. The twisted pairs are reversed at the midpoint of the cable so that the TPA and TPB viewed from node A are the TPB and TPA viewed from node B. During initial state, node A is signalling an Idle state by driving an Idle signal to both TPA and TPB, which is indicated as a line state (TPA, TPB)=(Z, Z).

Table 1 indicates a contention state in which the Request signal (Z, 0) from node A and the Idle signal (Z, Z) occur simultaneously on the cable and the line state of the cable as viewed from node B changes to a differential state (0, Z). Recognising that the node A has transmitted a Request signal, the node B responds to it with a Grant signal to give the bus ownership to node A. Table 2 indicates another contention state in which node A sends a Request signal (Z, 0) while node B sends a Grant signal (Z, 0). The line state of the cable viewed from node A changes to a differential state (0, 0). Node A recognises that the ownership of the bus is granted and transmits a Data Prefix signal (0, 1) that precedes subsequent packets. Table 3 indicates another contention state in which node A asserts a Data Prefix signal (0, 1) and node B asserts a Grant signal (Z, 0). Node B interprets the resulting differential line state (1, 0) as a Data Prefix signal and deasserts the Grant signal in order to receive packets from node A. In Table 4, node 1 asserts a Data Prefix signal (0, 1) and node B is in Idle state (Z, Z). Node 1 sees the differential line state (0, 1). Since this line state is the same as one that node A has sent, the node A does not respond to it. In this way, nodes attached to an IEEE-1394 serial bus exchanges information in a half-duplex mode.

Consider a three-node network of FIGS. 4A to 4D in which a node 2 is shown as the root node authorised to grant bus ownership. If nodes 1 and 3 assert Request signals R1 and R2 on child ports "0" and "2" of root node 2 as shown FIG. 4A and root node 2 receives R1 earlier than R2, the root node grants bus ownership to node 1 by asserting a Grant signal G3 on the child port "0" and informs node 2 of the fact that its request is denied by asserting a Data Prefix signal D3 on the child port "2" as shown in FIG. 4B. Node 1 sends a Data Prefix signal D4 which is followed by a packet P5 (FIG. 4C). Root node 2, on receiving the packet P5, successively transmits a Data Prefix D6 to node 3 before sending the packet P5 as a packet P7 (FIG. 4D). If the distance between nodes 2 and 3 are relatively short, it is likely that node 3 has deasserted the Request signal R2 before the packet P7 arrives, and hence no contention arises between R2 and P7.

In more detail, when the node 1 asserts the Request signal R1, the root node 2 responds with the Grant signal G3 (FIG.

5A). On receiving the Grant signal G3, the node 1 deasserts the Request signal R1 and transmits Data Prefix D4. Root node 2 then deasserts the Grant signal G3 to enter a packet receiving mode. Note that the length of the Grant signal G3 from root node 2 is equal to the turnaround time between nodes 1 and 2. The length of Data Prefix D4 is greater than the turnaround time to prevent contention between packet P5 and Grant signal G3. When the node 3 asserts the Request signal R2, the root node 2 is asserting the Data Prefix D3 (FIG. 5B). On receiving the Data Prefix D3, the node 3 deasserts the Request signal R2. In order for a packet from the root node 2 to be transmitted without encountering Request signal R2, it is necessary that the length of Data Prefix D3 is greater than the turnaround time between nodes 2 and 3. If these nodes are spaced apart a distance of 4.5 meters, the turnaround time is approximately 50 nanoseconds. Since the minimum length of the Data Prefix is specified as 140 nanoseconds, no contention occurs between the packet from root node 2 and Request signal P2 from node 3.

Development efforts for longer bus-length transmission have recently culminated as the P1394b Draft Standard for a High Performance Serial Bus (Supplement Draft 0.17 Apr. 23, 1999). The draft standard provides protocol for serial transmission of data on a full-duplex mode between nodes attached to an optical fiber or unshielded twisted pairs (UTP) to ensure full-duplex communication over a length longer than 4.5 meters, using 8B/10B block codes. The newly developed protocol may be used in combination with the current protocol of data-strobe codes. As one example, a four-node network is shown in FIG. 6, in which the distance between nodes 3 and 4 is greater than 4.5 meters and hence they are interconnected by 8B/10B ports, each including (as shown in FIG. 7) an 8B/10B encoder 11 and a parallel-to-serial converter 12 and a serial-to-parallel converter 13 and an 8B/10B decoder 14.

However, there is a likelihood of a situation in which a Request signal would remain asserted (i.e., not cancelled) in the longer-than-4.5-meter bus section and contend with other signals. As shown in FIG. 8A, assume that node 1 successively transmits a Data Prefix signal and a packet after it has acquired bus ownership and node 4 sends a Request to node 3 to request the bus ownership. The Data Prefix and the packet from node 1 are retransmitted by root node 2 to node 3, where they are further retransmitted to node 4. When the node 4 receives the Data Prefix signal from node 3, it deasserts the Request signal (FIG. 8B). However, if the data length of the packet from node 3 to node 4 is shorter than the distance between nodes 3 and 4, the node 3 will receive, after it has retransmitted the packet to node 4, the Request signal which remains asserted as a "ghost" between nodes 3 and 4. This ghost Request signal is received by node 3 and retransmitted to root node 2. Root node 2 responds to this ghost Request with a Grant signal as shown in FIG. 8C, and the node 4 responds to the packet from node 1 with an acknowledgment packet. After transmitting a Request signal, the node 3 enters a standby mode waiting for a Grant signal from its parent port. Since the node 3 is in the standby mode, the arrival of the acknowledgment packet from node 4 at its child port cannot enable the node 3 to change state and hence the acknowledgment packet is not received by node 3. As a result, the node 1 cannot receive acknowledgment from the node 4 for receipt of a packet even if it is properly received. Transitions of state machines of nodes 3 and 4 during a Normal process are shown in detail in FIG. 9. When a Data Prefix (DP) signal from node 2 arrives on node 3, the node 3 is in state RX, while the node 4 is in state A1 asserting a Request signal. Node 3 then retransmits the DP message and the following packet (PKT) and Date End (DE) message to node 4 and then momentarily changes to state A0 (=idle). Since the 8B/10B port of node 3 is still receiving the Request signal from node 4 after it has retransmitted the DE message to node 4, the node 3 changes to state A1 (=Request) following a momentary change to state A0. On the other hand, the node 4 receives the retransmitted Data Prefix signal (DP) from node 3 and deasserts the Request signal and changes to state RX to enter a packet receive mode for receiving DP, PKT and DE. Since the node 3 is in state A1 (=Request) at the instant the Request signal from node 4 is terminated, the Request signal remains as a ghost and propagated from node 3 to root node 2. Meanwhile, the node 4 receives the DE message from node 3 and changes to state TX to send a DP signal and an acknowledgment (ACK) message and a DE message to node 3. Node 3 is in state A1, waiting for a Grant signal from its parent port. If the ACK message arrives on node 3 in state A1, the state machine of node 3 cannot recognise the arrival of the ACK message.

SUMMARY OF THE INVENTION

It is therefore an object of the present invention to provide a transceiver circuit and method for ensuring normal packet transmission even if the distance between network nodes of a serial bus exceeds the 4.5-meter limit of the IEEE 1394 standard.

The stated object is obtained by setting the higher layer of a transceiver circuit to an idle state following the transmission of a packet for an interval corresponding to the turnaround time of a transmission medium connecting the transceiver circuit to a communicating transceiver circuit.

In general terms, the present invention provides a transceiver circuit of a network node for converting a signal received from a transmission medium to a decoded signal that can be recognised by a higher layer and transmitting packets received from the higher layer to the transmission medium, characterised by selector circuitry, and control circuitry for controlling the selector circuitry for supplying the decoded signal to the higher layer and supplying, instead of the decoded signal, an idle signal to the higher layer for a predefined time interval which starts at the end timing of a packet transmitted from the higher layer to the transmission medium, the idle signal indicating that the network node is in an idle state.

In specific terms, the present invention provides network node attached to a serial bus, comprising first circuitry for exchanging signals between the network node and a remote node attached to a distant end of the bus and determining therefrom a turnaround time between said nodes, and second circuitry for supplying a signal received from the serial bus to a higher layer and supplying, instead of said received signal, an idle signal to the higher layer for an interval beginning with an end timing of a packet transmitted from the higher layer to the bus until that interval corresponds to the turnaround time. The first circuitry may increment a count value beginning with a start timing of a child notify signal transmitted from the node to the bus and terminate the increment of the count value at an end timing of a parent notify signal received by the node from the bus to represent the turnaround time.

BRIEF DESCRIPTION OF THE DRAWINGS

The present invention will be described in further detail with reference to the accompanying drawings, in which:

FIGS. 4A–4D are schematic illustrations of a three-node network when contention occurs between packet transmissions;

FIGS. 5A and 5B are sequence diagrams for describing details of transmissions between two nodes of the three-node network of FIGS. 4A–4D;

FIG. 13 is a flowchart for implementing the present invention in a stored program.

DETAILED DESCRIPTION

Figure 10:
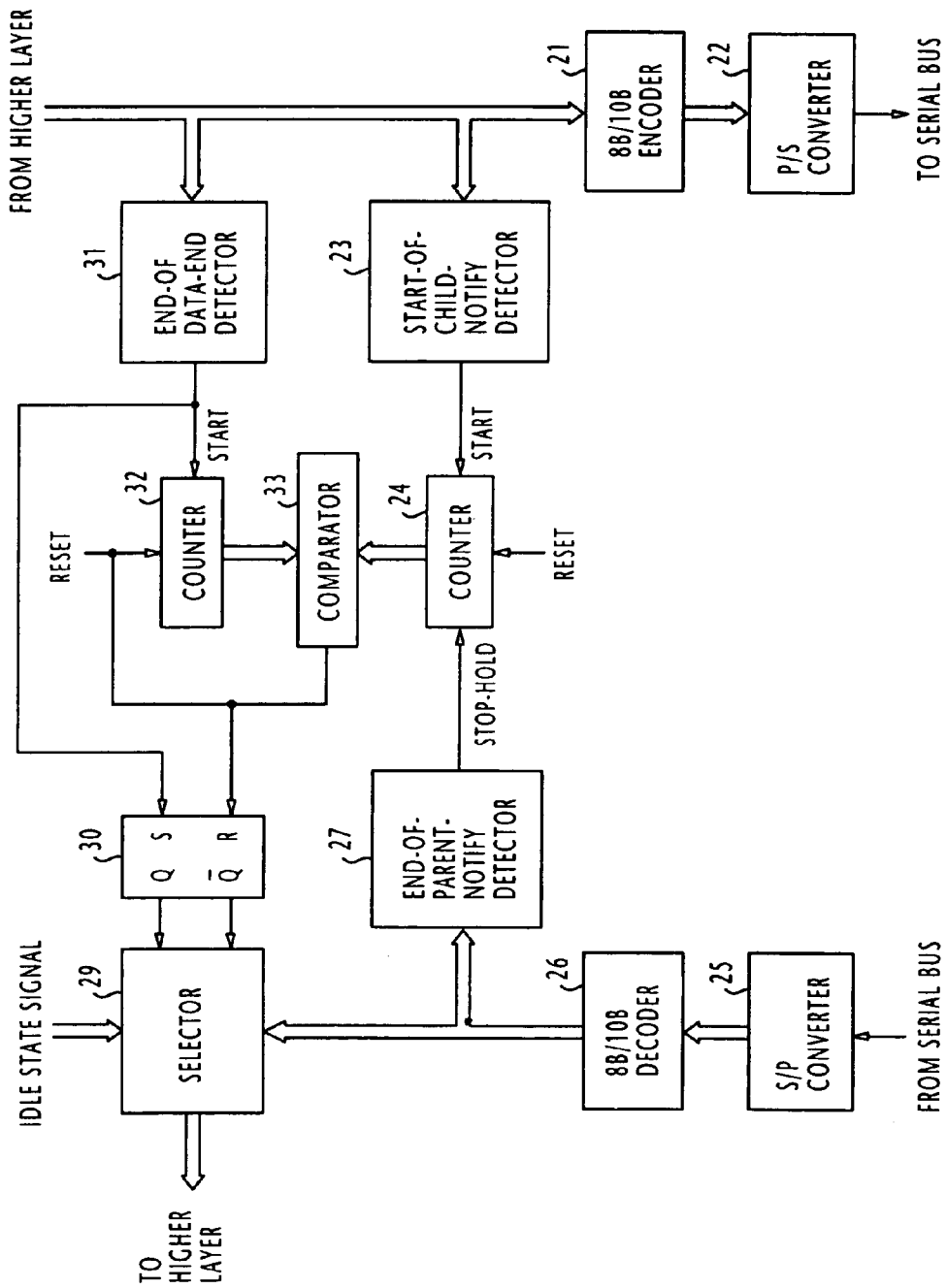
FIG. 10 is a block diagram of a transceiver circuit according to the present invention.

Referring to FIG. 10, there is shown a long-distance IEEE-1394 transceiver circuit according to the present invention. This transceiver circuit can be used as a long-distance (such as 8B/10) port of an IEEE-1394 network node. The transceiver circuit includes an 8B/10B encoder 21 for encoding a signal from a higher layer to coded parallel data, which is converted to a serial bit stream by a parallel-to-serial converter 22 and forwarded onto a serial bus whose length to an adjacent node is longer than 4.5 meters. The parallel data from the higher layer is further supplied to a start-of-Child-Notify detector 23 to produce a triggering signal for a time counter 24 at the start timing of a Child Notify signal from the higher layer. Signals from the serial bus are converted to parallel data in a serial-to-parallel converter 25 and decoded by an 8B/10B decoder 26. The output of decoder 26 is connected to an end-of-Parent-Notify detector 27 to produce a stop-and-hold signal for the time counter 24 to stop its count operation and hold the attained count value.

The time counter 24 of an IEEE-1394 node increments its count value for an interval beginning with the start timing of a Child Notify signal asserted by the local node to the end timing of a Parent Notify signal asserted from a contending remote node. The output of time counter 24 represents the turnaround time between the local node and the contending node. The output of time counter 24 is obtained during a Tree ID process.

The output of decoder 26 is further supplied to a selector 29 to which an idle state (pseudo-idle state) signal is also applied. Selector 29 receives a control signal from a flip-flop 30 for selectively coupling the decoded signal or the idle state signal to the higher layer.

An end-of-Data-End detector 31 is provided for detecting the end timing of a Data-End signal transmitted from the local node to produce a triggering signal for a time counter 32. Time counter 32 starts incrementing its count in response to the detected end timing of the transmitted Data End signal.

The count value of time counter 24 and the incrementing count value of time counter 32 are compared by a comparator 33. Comparator 33 produces an output signal when the output of counter 32 equals the output of counter 24.

Flip-flop 30 has a set input terminal (S) coupled to the output of end-of-Data-End detector 31 and a reset input terminal (R) coupled to the output of comparator 33. When the flip-flop 30 is set in response to the output of end-of-Data-End detector 31, it controls the selector 29 to supply the idle state signal to the higher layer. The application of the idle state signal to the higher layer instead of the decoded bus signal prevents a deasserted Request signal from the serial bus from entering the higher layer. Thus, "ghost" Request signal no longer enters the state machine of the local node.

When the flip-flop 30 is reset by the comparator 33; it produces a signal that causes the selector 29 to couple the decoded data to the higher layer, instead of the idle state signal. Accordingly, immediately following the detection of the end timing of a packet transmission, an idle state signal is forcibly supplied to the higher layer as long as the operation of time counter 32 continues until its count value equals the internodal turnaround time. Time counter 32 is reset to zero in response to the output of comparator 33 for a subsequent packet transmission.

Time counters 24 and 32 are reset by a reset pulse initially produced at the time the transceiver circuit is powered on. Thus, during a Tree ID process, the flip-flop 30 is in a reset condition to supply a received bus signal to the higher layer. During a subsequent Normal process, the flip-flop is switched to set condition to supply an idle signal of duration corresponding to the internodal turnaround time to the higher layer.

Figure 1:
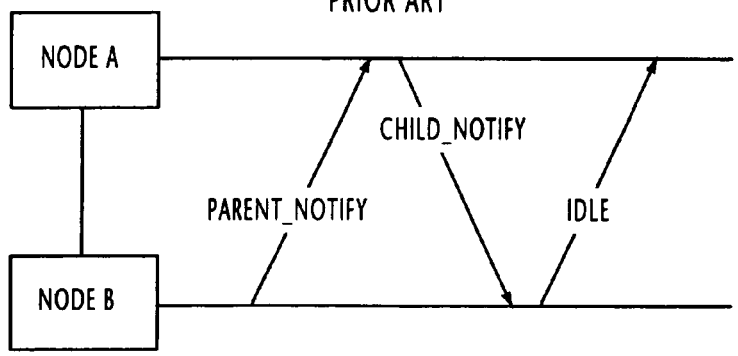
FIG. 1 is a sequence diagram of a typical Tree ID process between two nodes.
Figure 2:
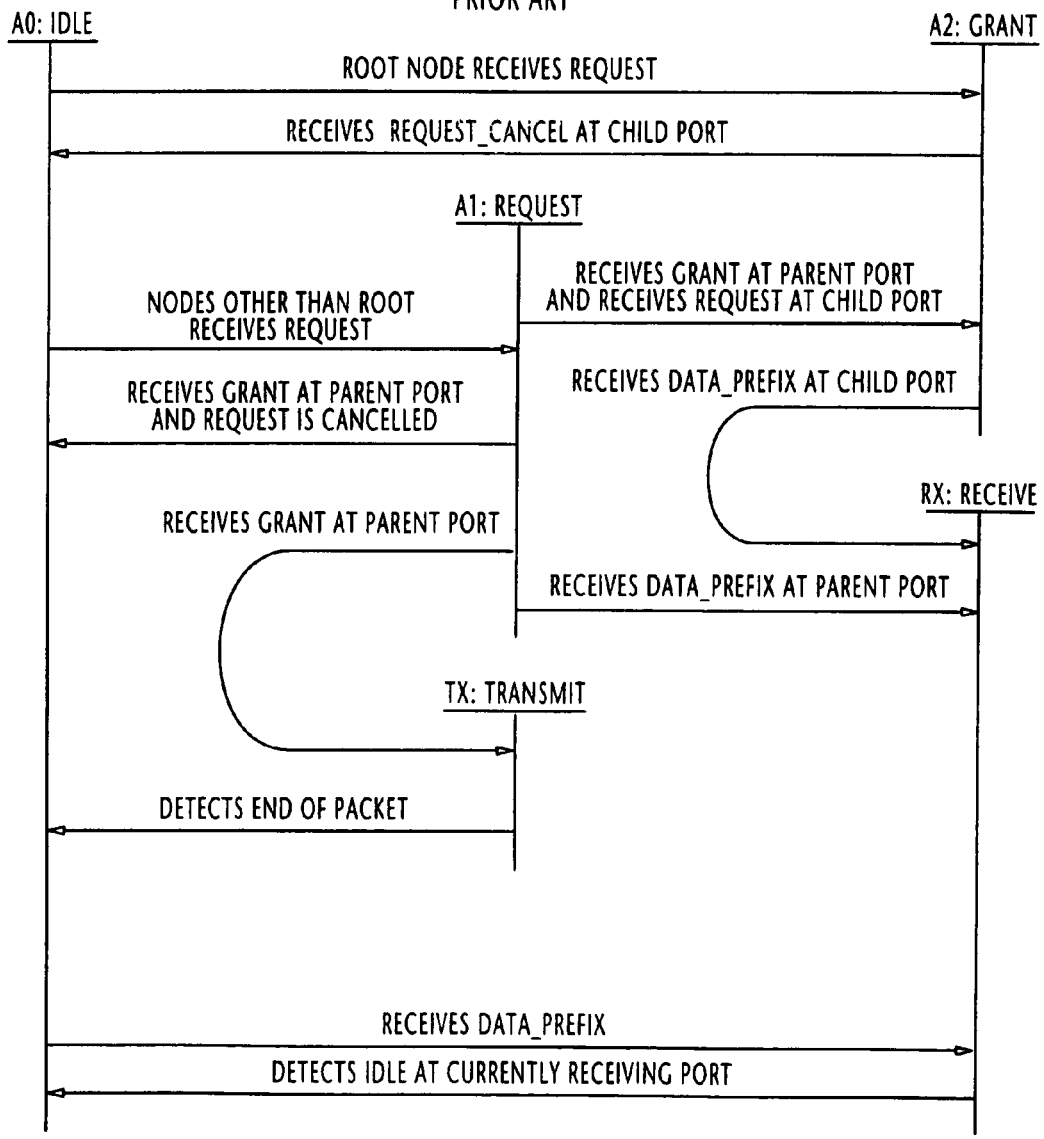
FIG. 2 is a sequence diagram of a Normal process a state machine, following a Tree ID process.
Figure 3:
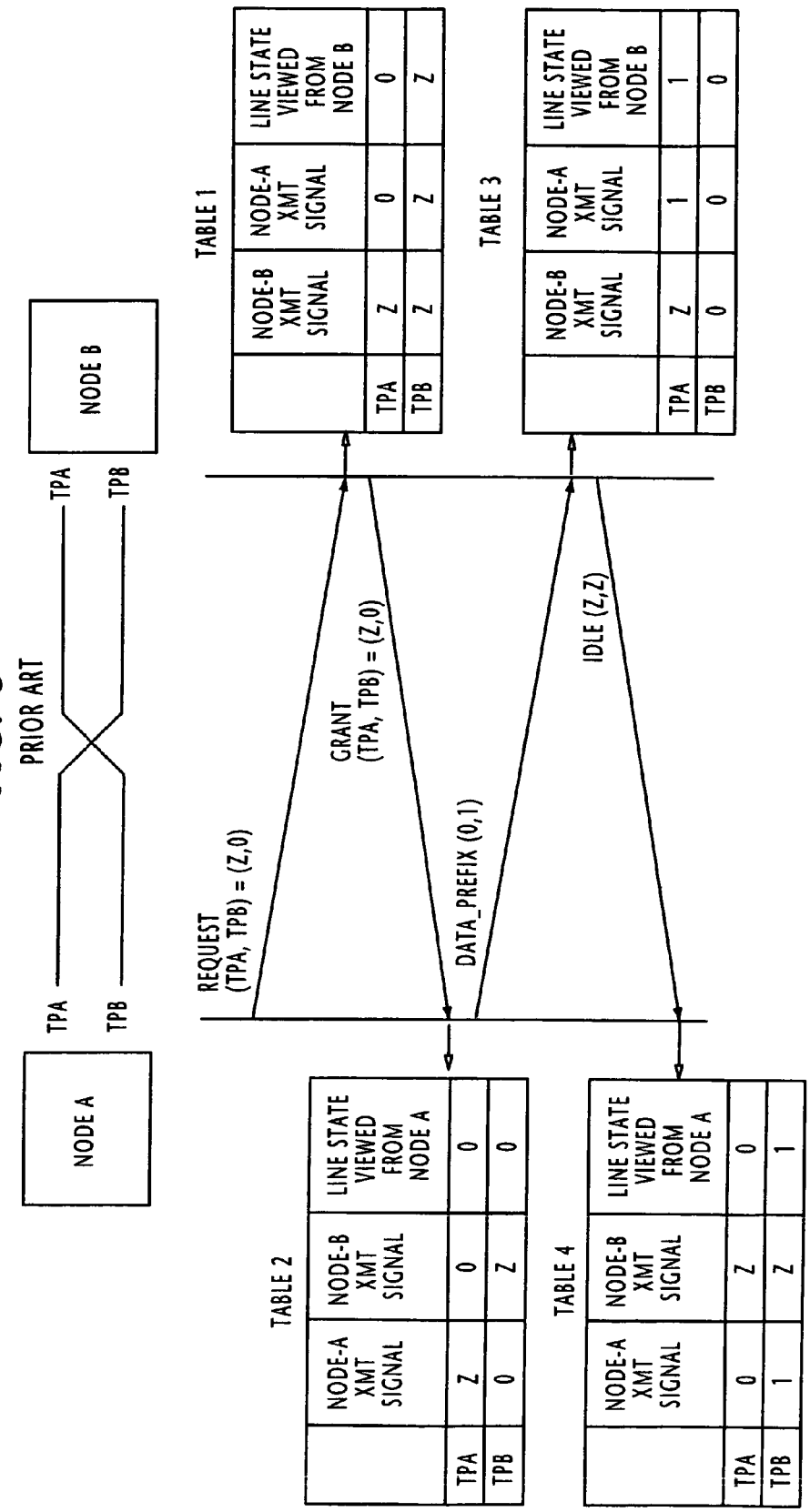
FIG. 3 is an illustration of various line states of twisted pairs when contention occurs between two nodes.
Figure 5A:
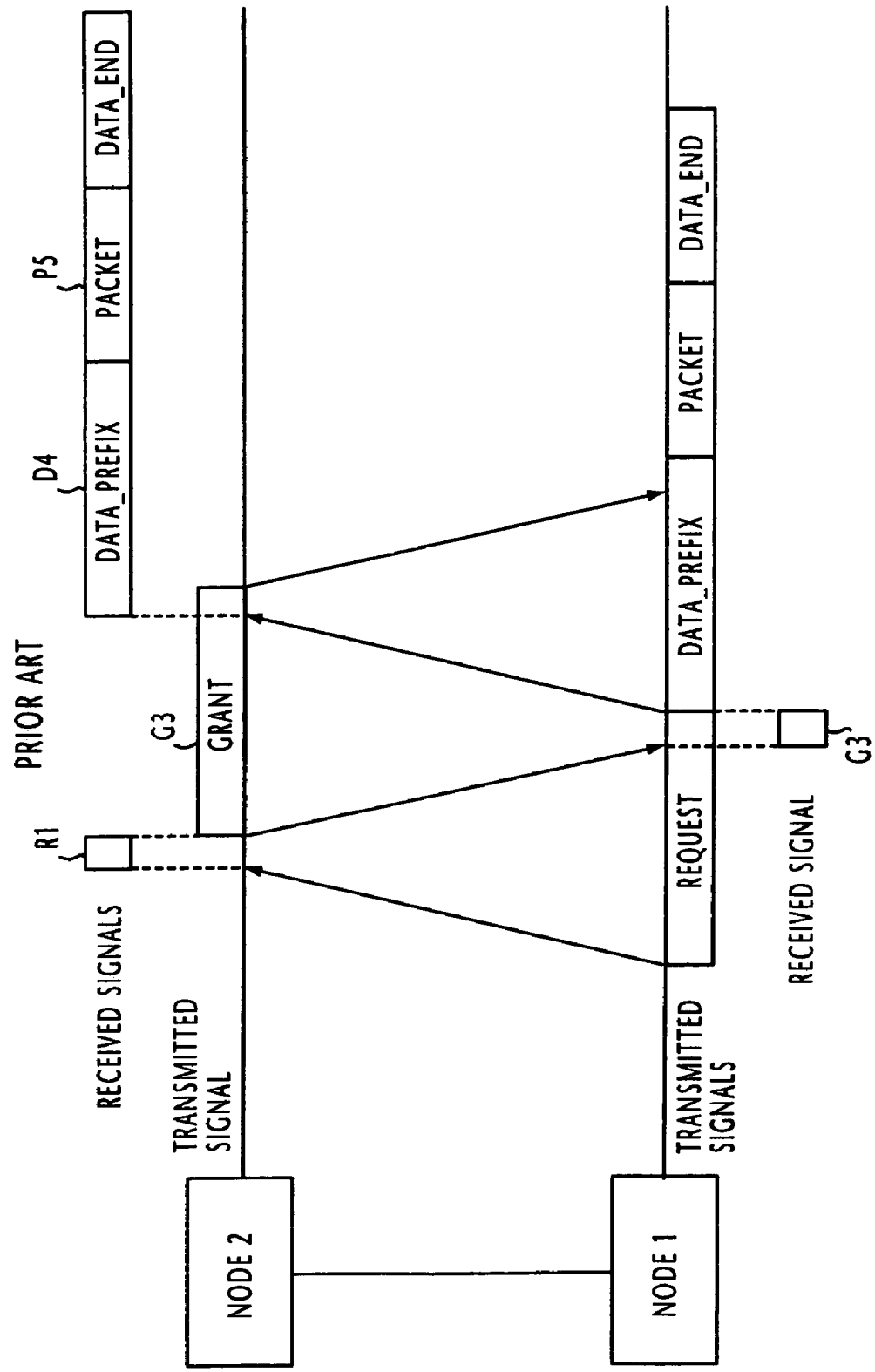
Figure 6:
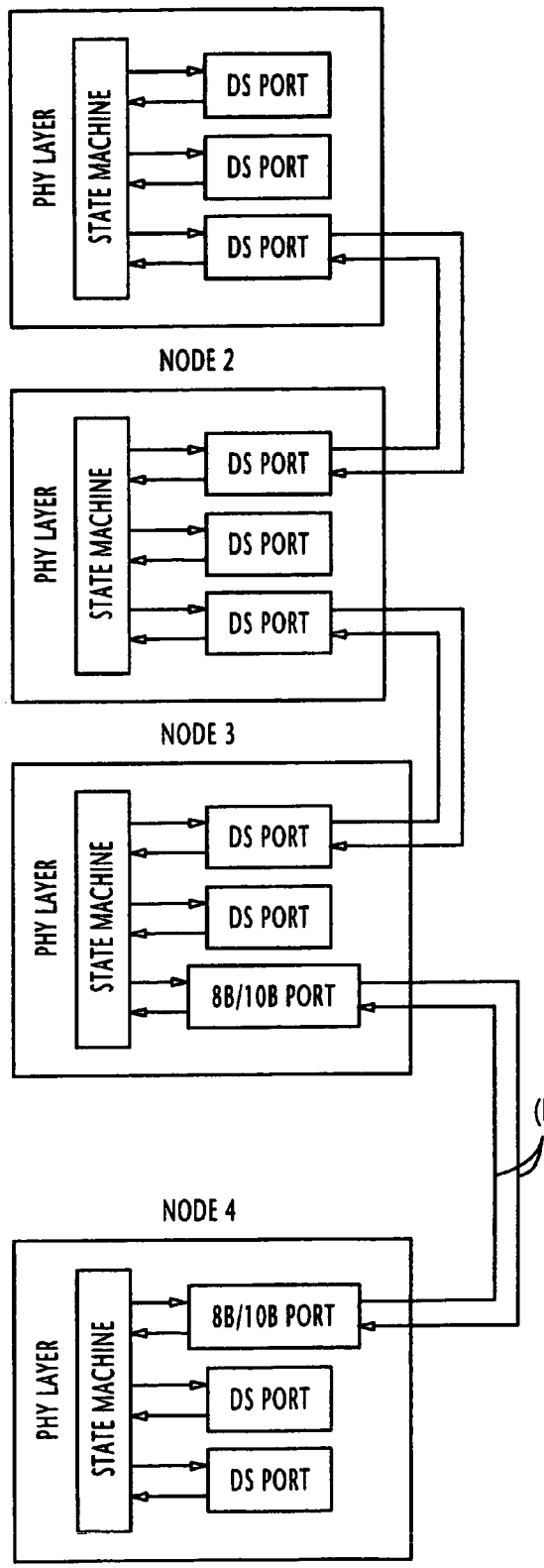
FIG. 6 is a block diagram of a network in which internodal distance exceeds the 4.5-meter limit of the IEEE-1394 standard.
Figure 7:
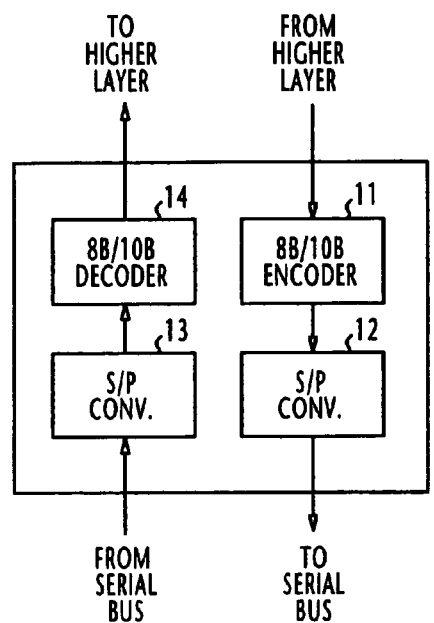
FIG. 7 is a block diagram showing details of a prior art long-distance port used in the network of FIG. 6.
Figure 8B:
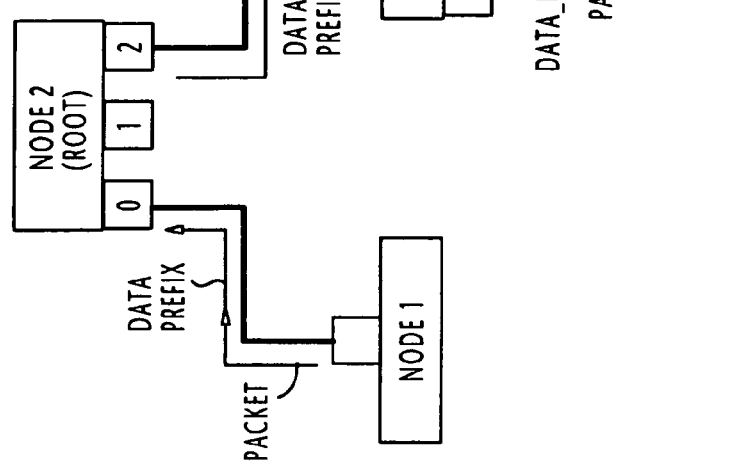
FIGS. 8A–8C are schematic illustrations of a four-node network when a contention occurs between packet transmissions over a section of the network that exceeds the 4.5-meter limit.
Figure 11:
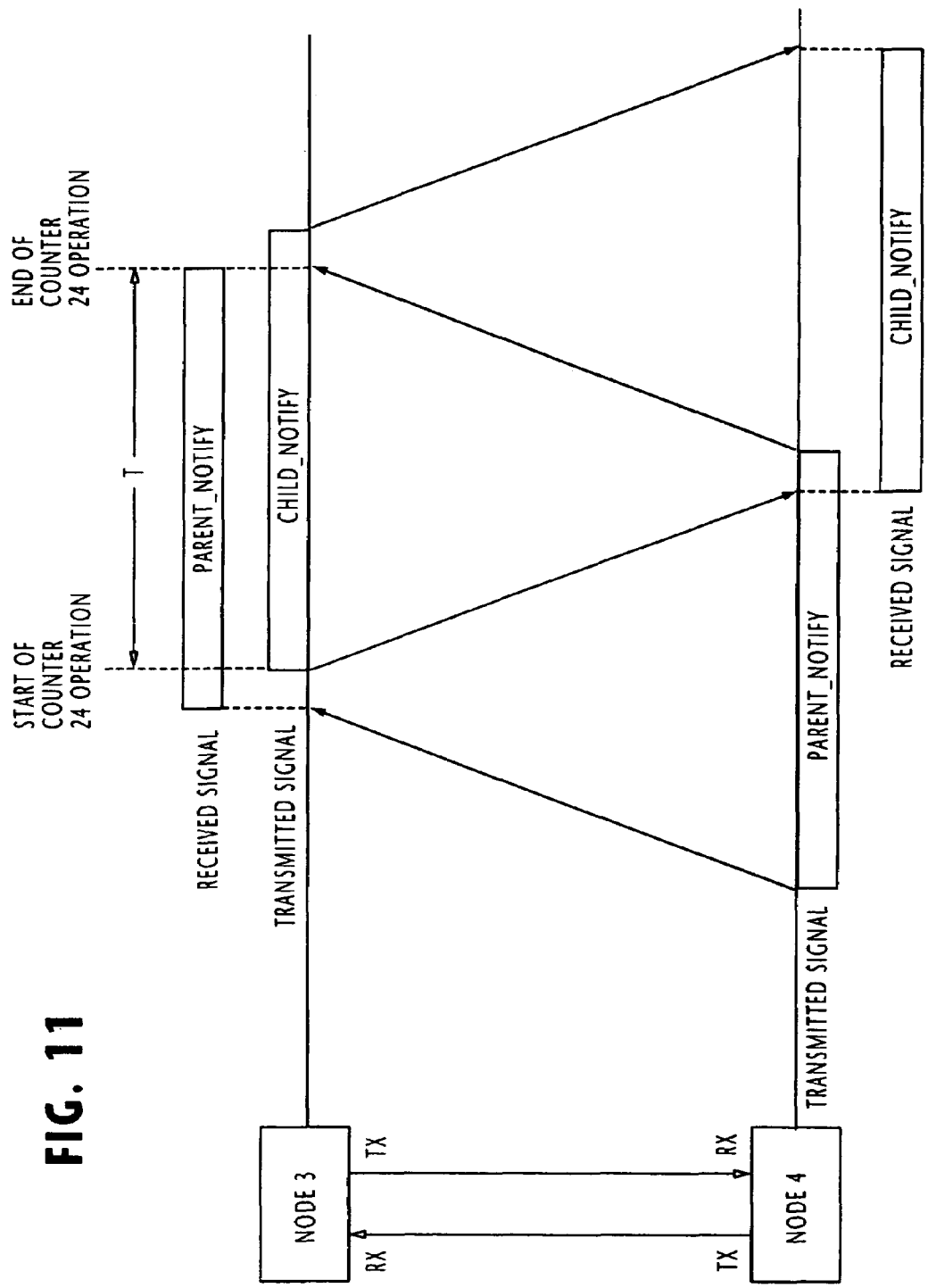
FIG. 11 is a sequence diagram of a Tree ID process of the present invention.

During the Tree ID process, one of a plurality of nodes of an IEEE-1394 serial bus is determined as a root node and the parent-child relationships of the nodes are established. The operation of the transceiver circuit of FIG. 10 during the Tree ID process will be better understood by the following description with reference to the sequence diagram of FIG. 11 by assuming that the same four-node network as shown in FIGS. 8A–8C is used and that the transceiver circuit of the present invention is used in the long-distance port of the nodes 3 and 4 of the four-node network.

Initially, the selectors 29 of nodes 3 and 4 are supplying decoded bus signals from the output of their decoder 26 to their higher layer. Node 4 first asserts a Parent Notify signal on the serial bus. On receiving the Parent Notify signal, the node 3 asserts a Child Notify signal on the serial bus. At the leading edge of the transmitted Child Notify signal, the start-of-Child-Notify detector 23 of node 3 enables the counter 24 to start incrementing its count value. Node 4, on receiving the Child Notify signal from node 3, deasserts the Parent Notify and starts signalling an Idle state on the serial bus. In response to the trailing edge of the received Parent Notify signal, the end-of-Parent-Notify detector 27 of node 3 disables the counter 24 to stop incrementing its count value. The count value "T" attained by the counter 24 of node 3 is thus equal to the turnaround time between nodes 3 and 4. The counter 24 of node 4 remains at zero count value.

Figure 8A:
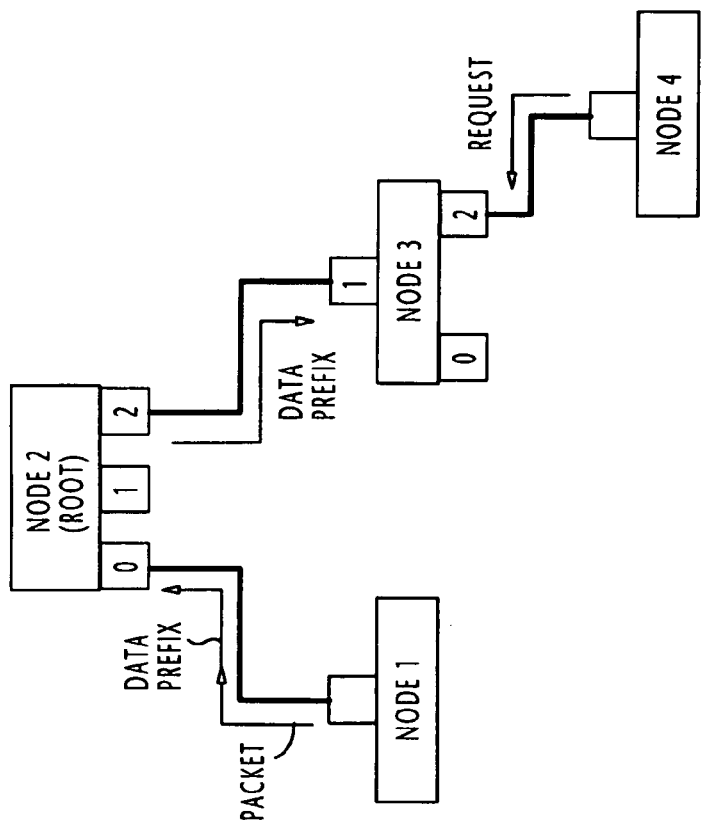
Figure 8C:
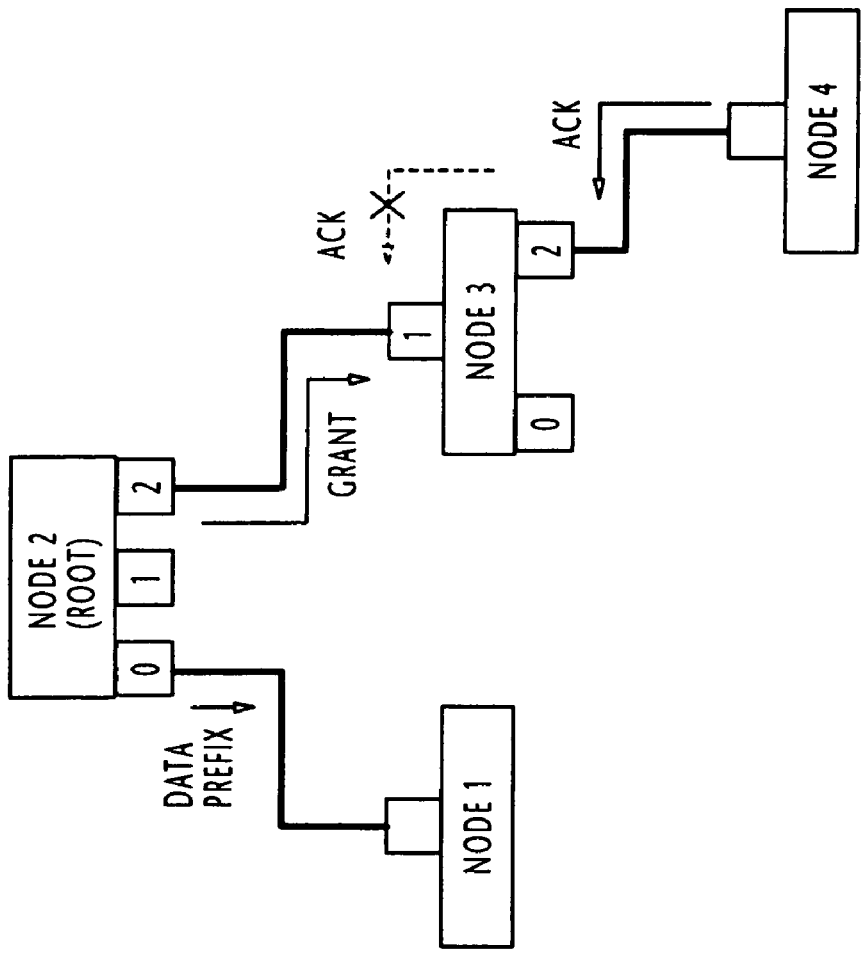
Figure 9:
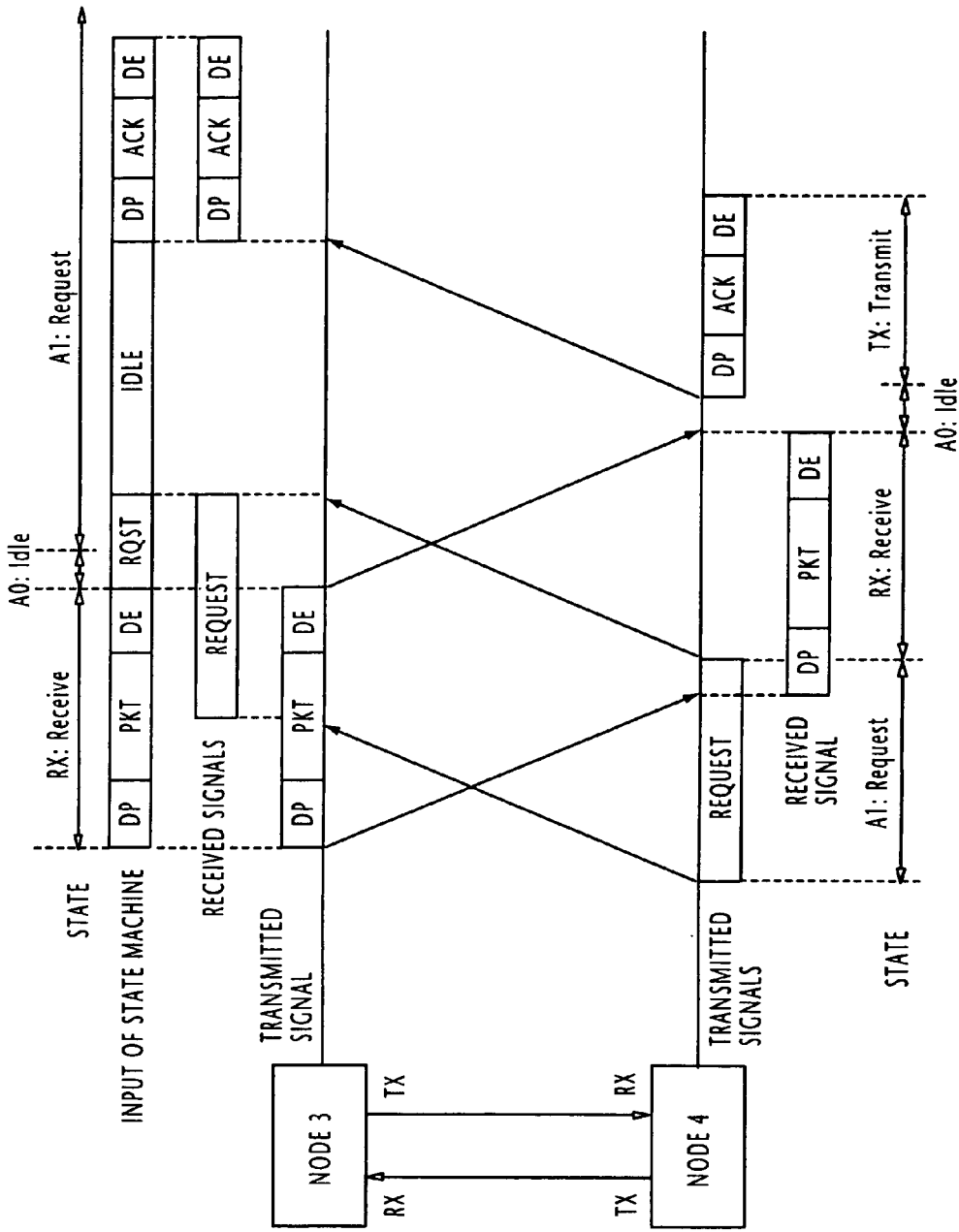
FIG. 9 is a sequence diagram of signals exchanged between two nodes of the network of FIGS. 8A–8C which are spaced a distance exceeding the 4.5-meter limit for illustrating how a ghost Request signal is produced.
Figure 12:
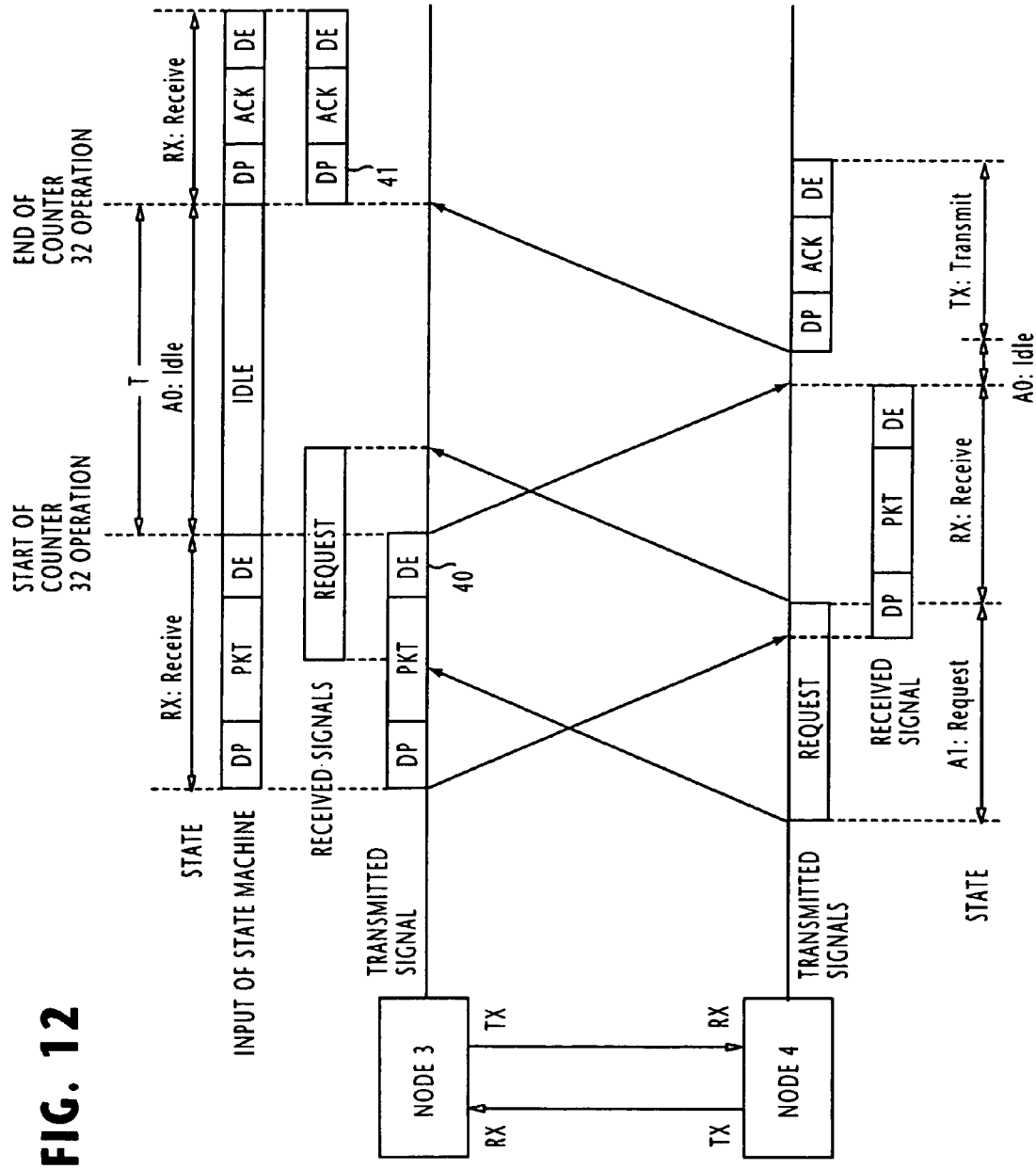
FIG. 12 is a sequence diagram of a Normal process of the present invention.

During a Normal process that follows, consider a situation similar to that shown in FIG. 8A in which the node 4 asserts a Request signal when the node 1 has already started transmitting packets. In this situation, the operation of nodes 3 and 4 proceeds as illustrated in FIG. 12. During the time node 3 is retransmitting the packets of node 2 to node 4, the node 3 is in state RX (=Receive). At the end of the packet retransmission, the end-of-Data-End detector 31 of node 3 drives the flip-flop 30 into set condition and enables the counter 32 to start incrementing its count value. Selector 29 of node 3 is therefore switched in response to the set condition of flip-flop 30 to supply the idle state (pseudo-idle state) signal to the higher layer, instead of the Request signal which the node 3 is receiving from the node 4. Thus, the state machine of node 3 is in state A0 (=idle) for an interval "T" from the instant a Data End message 50 has retransmitted to node 4 (FIG. 12) to the instant the time counter 32 attains the same count value as that of time counter 24. On receiving the retransmitted packet (i.e., DP, PKT, DE), the node 4 returns an acknowledgment message (i.e., DP, ACK, DE) to the node 3. This acknowledgment message arrives on the node 3 a period "T" after it has repeated a Data End message 40 to the node 4. Thus, the arrival time of a Data Prefix 41 of the acknowledgment message coincides with the instant at which the state machine of node 3 changes from state A0 (=Idle) to state RX.

In this way, the node 3 prevents the propagation of a deasserted Request signal of node 4 as a ghost signal to the root node 2 even though the distance between nodes 3 and 4 exceeds the 4.5-meter limit. Therefore, the node 3 can reliably receive an acknowledgment message from node 4, signalling successful receipt of a packet from node 1.

The present invention can also be implemented by a programmed routine stored in a storage medium as shown in FIG. 13. A Tree-ID process of a node starts with initialization step 101 in which count variables C1 and C2 are set equal to zero. At step 102, the state machine of the node is set equal to state RX to receive signals from the serial bus to the higher layer. Flow proceeds to decision step 103 to determine whether the node has received the starting point of a Child Notify signal from the higher layer. If the decision is affirmative at step 103, the count value C1 is continuously incremented (step 104). The routine proceeds to decision step 105 to determine whether a Parent Notify signal has received. If so, the routine proceeds to step 106 to stop incrementing the count value C1, terminating the Tree-ID process. The routine enters the Normal process starting with step 107 in which the state machine is set to state RX. If the node receives a Data End message from the higher layer (step 108), the count value C2 is continuously incremented at step 109 and the state machine is set to state A0 (=idle) at step 110. At decision step 111, the count value C2 is compared with the count value C1 obtained by step 106. The state machine of the node is set to A0 (=idle) until C2 becomes equal to C1, whereupon flow returns from step 111 to step 107 to set the state machine to state RX to continue the Normal process.

What is claimed is:

1. A transceiver circuit of a network node for converting a signal received from a transmission medium to a decoded signal that can be recognized by a higher layer and transmitting packets received from said higher layer to said transmission medium, the circuit comprising:

selector circuitry; and control circuitry for controlling the selector circuitry for supplying the decoded signal to said higher layer and supplying, instead of said decoded signal, an idle signal to said higher layer for a predefined time interval which starts at an end timing of a packet transmitted from said higher layer to said transmission medium, said idle signal indicating that the network node is in an idle state.

2. The transceiver circuit of claim 1, wherein said control circuitry is responsive to an end of said predefined time interval for supplying said decoded signal to said higher layer, instead of said simulated idle signal.

3. The transceiver circuit of claim 2, wherein said predefined time interval is equal to a turnaround time of said transmission medium.

4. The transceiver circuit of claim 2, wherein said control circuitry is configured to detect a data end message as an indication of the end of transmission of said packet.

5. The transceiver circuit of claim 1, wherein said predefined time interval is equal to a turnaround time of said transmission medium.

6. The transceiver circuit of claim 5, wherein said control circuitry comprises:

a start-of-child-notify detector for detecting a start timing of a child-notify signal from said higher layer which is transmitted from the network node to a child node as a response to a signal from the child node;

an end-of-parent-notify detector for detecting an end timing of parent-notify signal received from said child node;

first counter circuitry for incrementing a first count value in response to the detection of the start timing of said child-notify signal by the start-of-child-notify detector until said end-of parent-notify detector detects the end timing of said parent-notify signal; and comparator circuitry for comparing said first count value with a second count value which corresponds to said predefined time interval and controlling said selector circuitry according to relative values of said first count value to said second count value.

7. The transceiver circuit of claim 6, wherein said comparator circuitry comprises:

an end-of-data-end detector for detecting an end timing of a data-end signal transmitted from said higher layer to said transmission medium; and second counter circuitry for incrementing a second count value in response to the detection of the end timing of said data-end signal by the end-of-data-end detector until the second count value equals the incremented first count value and controlling said selector circuitry for supplying said idle signal to said higher layer for an interval during which said second counter circuitry continues to increment said second count value.

8. The transceiver circuit of claim 5, wherein said control circuitry is configured to detect a data end message as an indication of an end of transmission of said packet.

9. The transceiver circuit of claim 1, wherein said control circuitry is configured to detect a data end message as an indication of the end of transmission of said packet.

10. The transceiver circuit of claim 1, wherein said transmission medium comprises a serial bus and wherein said circuit further comprises a serial to parallel converter for converting a signal from said serial bus to a parallel signal, and a decoder for converting the parallel signal to said decoded signal.

11. The transceiver circuit of claim 10, wherein said serial to parallel converter is connected to said serial bus via an IEEE-1394 interface.

12. The transceiver circuit of claim 1, wherein said control circuitry comprises:
   a start-of-child-notify detector for detecting a start timing of a child-notify signal from said higher layer which is transmitted from the network node to a child node as a response to a signal from the child node.

13. The transceiver circuit of claim 12, wherein said control circuitry comprises:
   an end-of-parent-notify detector for detecting an end timing of parent-notify signal received from said child node; and
   first counter circuitry for incrementing a first count value in response to the detection of the start timing of said child-notify signal by the start-of-child-notify detector until said end-of parent-notify detector detects the end timing of said parent-notify signal.

14. The transceiver circuit of claim 13, wherein said control circuitry comprises:
   comparator circuitry for comparing said first count value with a second count value which corresponds to said predefined time interval and controlling said selector circuitry according to relative values of said first count value to said second count value.

15. A communication system comprising a plurality of nodes interconnected by transmission lines, wherein each of said nodes comprises:
   selector circuitry; and
   control circuitry for controlling the selector circuitry for supplying a decoded signal to a higher layer and supplying, instead of said decoded signal, an idle signal to said higher layer for a predefined time interval which starts at an end timing of a packet transmitted from said higher layer to a transmission medium, said idle signal indicating that a network node is in an idle state.

16. A communication method for a network node for converting a signal received from a transmission medium to a decoded signal that can be recognized by a higher layer and transmitting packets received from said higher layer to said transmission medium, the method comprising:
   supplying, instead of said decoded signal, an idle signal to said higher layer for a predefined time interval which starts at an end timing of a packet transmitted from said higher layer to said transmission medium, said idle signal indicating that the network node is in an idle state; and
   supplying the decoded signal to said higher layer, instead of said idle signal, at the end timing of said predefined time interval.

17. The method of claim 16, wherein said predefined time interval is equal to a turnaround time between said network node and a node connected to a distant end of said transmission medium.

18. A network node attached to a serial bus, comprising:
   first circuitry for exchanging signals between the network node and a remote node attached to a distant end of the bus and determining therefrom a turnaround time between said nodes; and
   second circuitry for supplying a signal received from the serial bus to a higher layer and supplying, instead of said received signal, an idle signal to said higher layer for an interval beginning with an end timing of a packet transmitted from said higher layer to said bus until said interval corresponds to the turnaround time, said idle signal indicating that the network node is in an idle state.

19. A network node attached to a serial bus, comprising:
   first circuitry for incrementing a count value beginning with a start timing of a child notify signal transmitted from the node to said bus and terminating the increment of the count value at an end timing of a parent notify signal received by the node from said bus; and
   second circuitry for supplying a signal received from the serial bus to a higher layer and supplying, instead of said received signal, an idle signal to said higher layer for an interval beginning with an end timing of a packet transmitted from said higher layer to said bus until said interval corresponds to the turnaround time, said idle signal indicating that the network node is in an idle state.

20. A transceiver circuit of a network node for converting a signal received from a transmission medium to a decoded signal that can be recognized by a higher layer and transmitting packets received from said higher layer to said transmission medium, the circuit comprising:
   selector circuitry; and
   means for controlling the selector circuitry for supplying the decoded signal to said higher layer and supplying, instead of said decoded signal, an idle signal to said higher layer for a predefined time interval which starts at an end timing of a packet transmitted from said higher layer to said transmission medium, said idle signal indicating that the network node is in an idle state.

* * * * *